US007007484B2

(12) United States Patent
Stegmaier et al.

(10) Patent No.: US 7,007,484 B2
(45) Date of Patent: Mar. 7, 2006

(54) METHODS AND APPARATUS FOR OPERATING GAS TURBINE ENGINES

(75) Inventors: James William Stegmaier, West Chester, OH (US); Narendra Joshi, Cincinnati, OH (US)

(73) Assignee: General Electric Company, Schenecady, NY (US)

( * ) Notice: Subject to any disclaimer, the term of this patent is extended or adjusted under 35 U.S.C. 154(b) by 412 days.

(21) Appl. No.: 10/456,409

(22) Filed: Jun. 6, 2003

(65) Prior Publication Data

US 2004/0244380 A1 Dec. 9, 2004

(51) Int. Cl.
*F02C 1/02* (2006.01)

(52) U.S. Cl. .......................................... 60/772; 60/728

(58) Field of Classification Search .................. 60/772, 60/728
See application file for complete search history.

(56) References Cited

U.S. PATENT DOCUMENTS 4,896,499 A * 1/1990 Rice ............................ 60/792
5,321,944 A * 6/1994 Bronicki et al. .............. 60/775
5,457,951 A * 10/1995 Johnson et al. ............... 60/780
5,553,448 A 9/1996 Farrell et al.
5,768,884 A 6/1998 Hines
5,832,714 A 11/1998 Hines
6,050,080 A 4/2000 Homer
6,050,082 A 4/2000 Leonard et al.
6,173,563 B1 1/2001 Vakil et al.
6,470,686 B1 10/2002 Pierson
6,484,506 B1 * 11/2002 Bellac et al. ................. 60/772
6,484,508 B1 11/2002 Rocklin et al.

* cited by examiner

*Primary Examiner*—Charles G. Freay
(74) *Attorney, Agent, or Firm*—Armstrong Teasdale LLP

(57) ABSTRACT

A method for operating a gas turbine engine including a compressor, combustor, and turbine is provided that includes channeling compressed airflow from the compressor to a heat exchanger having a working fluid circulating within, channeling the working fluid from the heat exchanger to a chiller, extracting energy from the working fluid to power the chiller, and directing airflow entering the gas turbine engine through the inlet chiller such that the temperature of the airflow is reduced prior to the airflow entering the compressor.

18 Claims, 1 Drawing Sheet

METHODS AND APPARATUS FOR OPERATING GAS TURBINE ENGINES

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines also may include a low-pressure compressor, or booster, for supplying compressed air to the high pressure compressor.

Gas turbine engines are used in many applications, including in aircraft, power generation, and marine applications. The desired engine operating characteristics vary, of course, from application to application. More particularly, when the engine is operated in an environment in which the ambient temperature is reduced in comparison to other environments, the engine may be capable of operating with a higher shaft horse power (SHP) and an increased output, without increasing the core engine temperature to unacceptably high levels. However, if the ambient temperature is increased, the core engine temperature may rise to an unacceptably high level if a high SHP output is being delivered.

To facilitate meeting operating demands, even when the engine ambient temperature is high, e.g., on hot days, at least some known gas turbine engines include inlet system evaporative coolers or refrigeration systems to facilitate reducing the inlet air temperature. Known refrigeration systems include inlet chilling. Other systems use water spray fogging or injection devices to inject water into either the booster or the compressor to facilitate reducing the operating temperature of the engine. However, within known gas turbine engines, heat energy removed from the working fluid or gas path air, while cooling the gas path air, is eventually lost to the atmosphere rather than used to further improve the efficiency of the turbine.

BRIEF DESCRIPTION OF THE INVENTION

In one aspect, a method for operating a gas turbine engine including a compressor, combustor, and turbine is provided that includes channeling compressed airflow from the compressor to a heat exchanger having a working fluid circulating within to extract energy and thus reduce its temperature. The working fluid from the heat exchanger is channeled to a chiller, extracting energy from the working fluid to power the chiller, and directing airflow entering the gas turbine engine through the inlet chiller such that the temperature of the airflow is reduced prior to the airflow entering the compressor.

In another aspect, a cooling system is provided for a gas turbine engine including a compressor and a turbine. The system includes a heat exchanger coupled downstream from the compressor, such that compressed discharge air from the compressor is routed through the heat exchanger. The heat exchanger has a working fluid circulating within. A chiller is coupled in flow communication to the heat exchanger and extracts energy from the working fluid to facilitate reducing the temperature of inlet air channeled to the compressor.

DETAILED DESCRIPTION OF THE INVENTION

Figure 1:
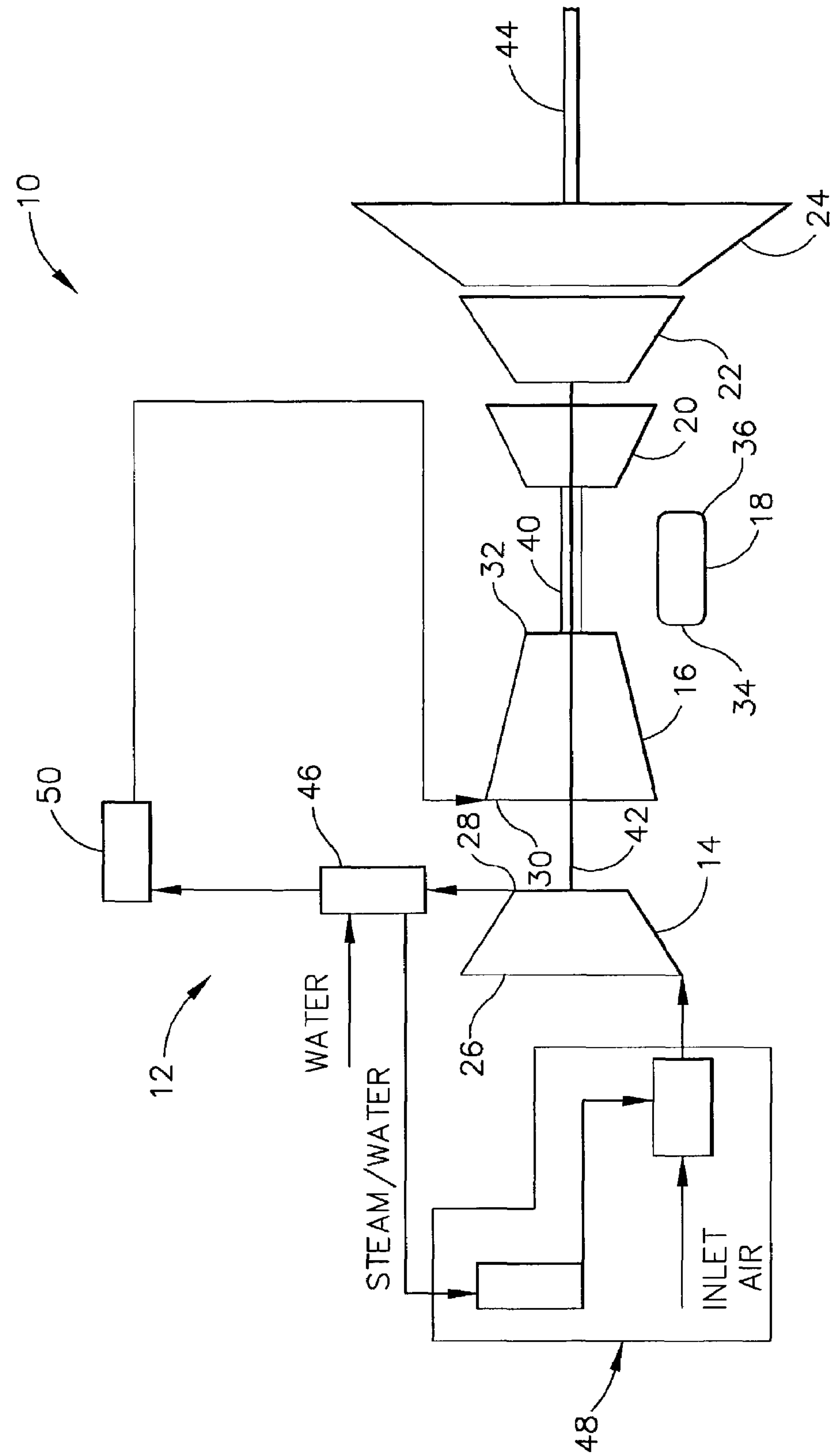
FIG. 1 is a block diagram of an exemplary gas turbine engine including a cooling system.

FIG. 1 is a block diagram of a gas turbine engine 10 which includes a system for cooling gas path air generally represented at 12. With the exception of gas path air cooling system 12, which will be described hereinafter, engine 10 is known in the art and includes, in serial flow relationship, a low pressure compressor or booster 14, a high pressure compressor 16, a combustor 18, a high pressure turbine 20, a low pressure, or intermediate, turbine 22, and a power turbine or free turbine 24. Low pressure compressor or booster 14 has an inlet 26 and an outlet 28. High pressure compressor 16 includes an inlet 30 and an outlet 32. Combustor 18 has an inlet 34 that is substantially coincident with high pressure compressor outlet 32, and an outlet 36. High pressure turbine 20 is coupled to high pressure compressor 16 with a first rotor shaft 40, and low pressure turbine 22 is coupled to low pressure compressor 14 with a second rotor shaft 42. Rotor shaft 42 is coaxially positioned within first rotor shaft 40 about a longitudinal centerline axis of engine 10. Engine 10 may be used to drive a load (not shown) which may be located aft of engine 10 and is also drivingly coupled to a power turbine shaft 44. Alternatively, the load may be disposed forward of engine 10 and coupled to a forward extension (not shown) of second rotor shaft 42.

In operation, outside air is drawn into inlet 26 of low pressure compressor 14, and compressed air is supplied from low pressure compressor 14 to high pressure compressor 16. High pressure compressor 16 further compresses the air and delivers the high pressure air to combustor 18 where it is mixed with fuel and the fuel ignited to generate high temperature combustion gases. The combustion gases are channeled from combustor 18 to drive turbines 20, 22, and 24.

The power output of engine 10 is related to the temperatures of the gas flow at various locations along the gas flow path. More specifically, the temperature at high-pressure compressor outlet 32 and the temperature of combustor outlet 36 are closely monitored during the operation of engine 10. Lowering the temperature of the gas flow entering the compressor generally results in increasing the power output of engine 10.

Cooling system 12 includes a heat exchanger 46 coupled in flow communication to low pressure compressor 14, and a chiller 48 coupled in flow communication to heat exchanger 46. Heat exchanger 46 has a working fluid flowing therethrough for storing energy extracted from the gas flow path. In one embodiment, the working fluid is at least one of, but is not limited to being steam or water. More specifically, heat exchanger 46 extracts heat energy from the gas flow path and uses the extracted energy to power chiller 48. Specifically, the working fluid is routed to chiller 48 wherein energy is extracted from the working fluid to power chiller 48. Chiller 48 facilitates cooling inlet air supplied to compressor inlet 26. In one embodiment, the heat exchanger 46 is a heat recovery steam generator. In another embodiment, heat exchanger 46 is a water-to-air heat exchanger. In one embodiment, chiller 48 is an absorption chiller.

Cooling system 12 also includes an intercooler 50 in flow communication with, and downstream from, heat exchanger 46. Gas flow from heat exchanger 46 is channeled to intercooler 50 for additional cooling prior to being returned to high-pressure compressor 16. In one embodiment, intercooler 50 is a heat exchanger.

In operation, compressor discharge flow is channeled from low-pressure compressor 14 to heat exchanger 46. Heat exchanger 46 extracts sufficient heat energy from the flow to power chiller 48, while cooling the discharge flow in the process. The extracted energy is stored in the working fluid which is then channeled to chiller 48 and used to power chiller 48. Chiller 48 reduces an operating temperature of inlet air entering low-pressure compressor 14. Chiller 48 operates in a manner that is known in the art to provide cooling to reduce the operating temperature of the gas turbine inlet air.

As an example, on a 110° F. day, cooling system 12, with steam or hot water as a working fluid, can extract sufficient energy to chill the inlet air at low-pressure compressor inlet to at least 59° F., thus facilitating an improvement in both power output from turbine engine 10 and an increase in operating efficiency of engine 10. In one embodiment, the low-pressure compressor discharge air is reduced at least 100° F. by using the process described herein.

Heat exchanger 46 is in flow communication with intercooler 50 which receives cooled discharge air from heat exchanger 46. The discharge air can be additionally cooled to a desired temperature using intercooler 50 before being returned to high-pressure compressor 16. Such a reduction in the operating temperature of the gas flow facilitates reducing the power requirements for high-pressure compressor 16 and this leaves more energy available for power turbine 24. In addition, the temperatures at high-pressure compressor outlet 32 is reduced so that the engine 10 operates with greater temperature margins relative to temperature design limits.

The above-described cooling system provides a cost-effective and highly reliable method for gas flow cooling in a gas turbine engine. The cooling system uses heat energy removed from the gas path while cooling the gas path air to facilitate increasing the potential power output of the engine. Accordingly, a gas path cooling system is provided that facilitates reducing gas path temperatures thereby improving engine efficiency and reliability in a cost-effective manner.

Exemplary embodiments of gas path cooling systems are described above in detail. The gas path cooling systems are not limited to the specific embodiments described herein, but rather, components of the system may be utilized independently and separately from other components described herein. Each gas path cooling component can also be used in combination with other gas path cooling components.

While the invention has been described in terms of various specific embodiments, those skilled in the art will recognize that the invention can be practiced with modification within the spirit and scope of the claims.

What is claimed is:

1. A method for operating a gas turbine engine, including a compressor, a combustor and a turbine, coupled in serial flow arrangement, said method comprising:

channeling compressed airflow from the compressor to a heat exchanger having a working fluid circulating therethrough to transfer heat energy to the working fluid;

channeling the working fluid from the heat exchanger to an inlet chiller;

extracting energy from the working fluid to power the inlet chiller; and directing airflow entering the gas turbine engine through the inlet chiller such that a temperature of the airflow is reduced prior to the airflow entering the compressor.

2. A method in accordance with claim 1 further comprising:

channeling airflow from the heat exchanger to an intercooler downstream from the heat exchanger, such that a temperature of the airflow is reduced prior to being directed back toward the turbine.

3. A method in accordance with claim 1 wherein the gas turbine engine includes a high-pressure and a low-pressure compressor, said channeling compressed airflow from the compressor comprises channeling compressed airflow from the low-pressure compressor.

4. A method in accordance with claim 1 wherein said channeling compressed airflow from the compressor to a heat exchanger further comprises channeling airflow to a heat exchanger including at least one of water, steam, and a mixture of water and ammonia circulating therethrough.

5. A cooling system for a gas turbine engine, wherein the gas turbine engine includes at least a compressor and a turbine, said cooling system comprising:

a heat exchanger coupled downstream from the compressor such that compressed discharge air from the compressor is routed therethrough, said heat exchanger having a working fluid circulating therethrough to transfer heat energy from the compressed discharge air to the working fluid; and a chiller coupled in flow communication to said heat exchanger, said chiller extracting energy from the working fluid to facilitate reducing a temperature of inlet air channeled to the compressor.

6. A cooling system in accordance with claim 5 wherein the gas turbine engine includes a low-pressure compressor and a high-pressure compressor downstream of the low-pressure compressor, said heat exchanger is positioned between the low-pressure compressor and the high-pressure compressor.

7. A cooling system in accordance with claim 5 further comprising an intercooler coupled downstream from said heat exchanger, said intercooler configured to receive airflow from said heat exchanger at a first temperature, and channel the airflow to the compressor at a second temperature that is lower than the first temperature.

8. A cooling system in accordance with claim 7 wherein the gas turbine engine includes a low-pressure compressor and a high-pressure compressor downstream of the low-pressure compressor, said heat exchanger and said intercooler are positioned between the low-pressure compressor and the high-pressure compressor.

9. A cooling system in accordance with claim 5 wherein the heat exchanger working fluid is at least one of water, steam, and a mixture of ammonia and water.

10. A cooling system in accordance with claim 5 wherein said heat exchanger is a heat recovery steam generator.

11. A gas turbine engine comprising:

a compressor;

a combustor;

a turbine coupled in flow communication with said compressor;

a heat exchanger in flow communication downstream from said compressor to receive compressed discharge air therefrom, said heat exchanger having a working fluid flowing therethrough to extract energy from the discharged air; and a chiller coupled in flow communication to said heat exchanger, said chiller configured to extract energy from the working fluid to facilitate reducing a temperature of air supplied to said compressor.

12. A gas turbine engine in accordance with claim 11 wherein said heat exchanger is a heat recovery steam generator.

13. A gas turbine engine in accordance with claim 11 wherein said chiller is an absorption chiller.

14. A gas turbine engine in accordance with claim 11 wherein said compressor comprises a low-pressure compressor and a high-pressure compressor coupled downstream from said low-pressure compressor, said heat exchanger is coupled in flow communication between said low-pressure compressor and said high-pressure compressor.

15. A cooling system in accordance with claim 11 further comprising an intercooler coupled downstream from said heat exchanger, said intercooler configured to receive airflow from said heat exchanger at a first temperature, and channel the airflow to the compressor at a second temperature that is lower than the first temperature.

16. A gas turbine engine in accordance with claim 15 further comprising an intercooler coupled downstream from said heat exchanger, such that said intercooler receives airflow from said heat exchanger at a first temperature, said intercooler configured to discharge the airflow to said compressor at a second temperature that is lower than the first temperature.

17. A gas turbine engine in accordance with claim 16 wherein said compressor comprises a low-pressure compressor and a high-pressure compressor coupled downstream from said low-pressure compressor, said heat exchanger and said intercooler coupled in flow communication between said low-pressure compressor and said high-pressure compressor.

18. A gas turbine engine in accordance with claim 11 wherein said working fluid is at least one of water, steam, and a mixture of ammonia and water.

* * * * *